March 10, 1959   E. TOMKOW   2,876,550
GAGE FOR CHECKING INTERNAL AND EXTERNAL DIMENSIONS
Filed Jan. 27, 1956   2 Sheets-Sheet 1
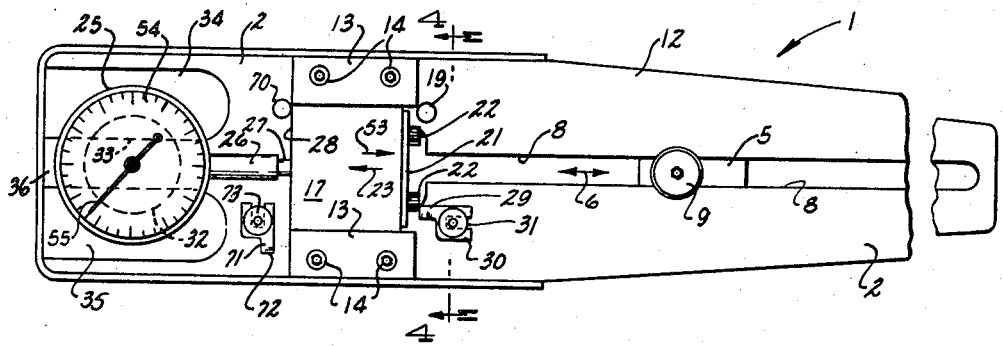
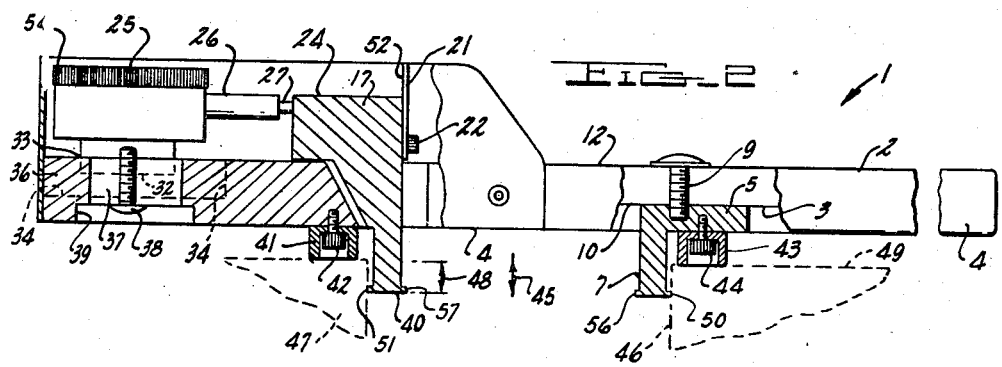
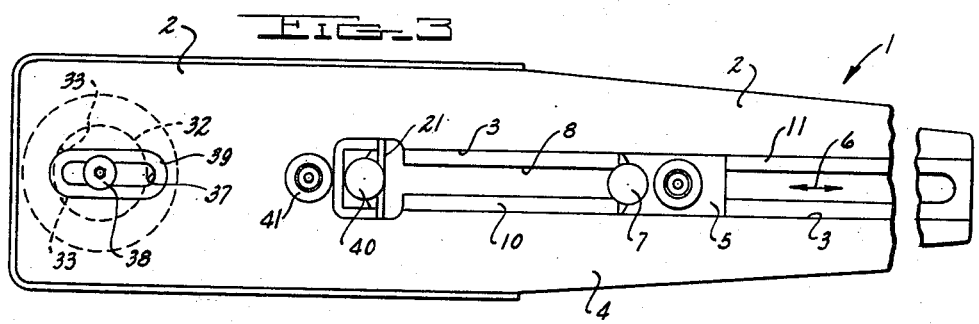
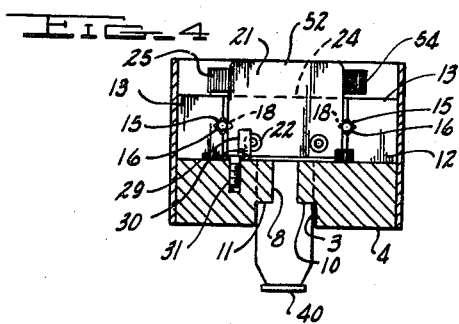
INVENTOR.
EDWARD TOMKOW
BY
SMITH, OLSEN & KOTTS
ATTORNEYS March 10, 1959 E. TOMKOW 2,876,550
GAGE FOR CHECKING INTERNAL AND EXTERNAL DIMENSIONS
Filed Jan. 27, 1956 2 Sheets-Sheet 2
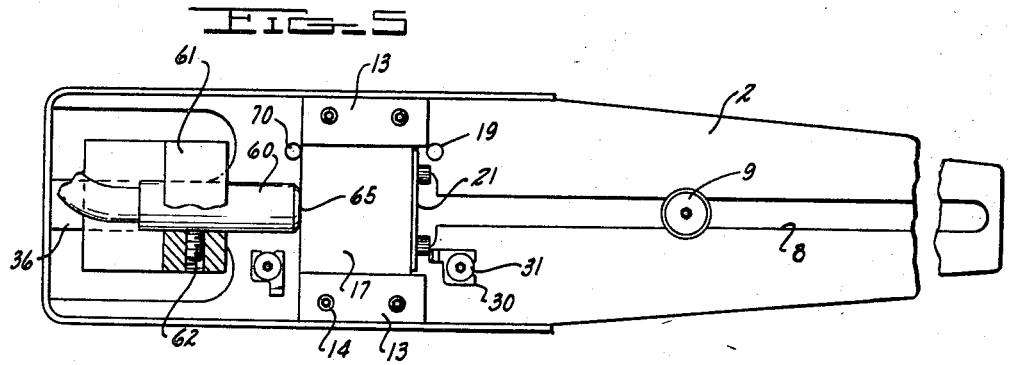
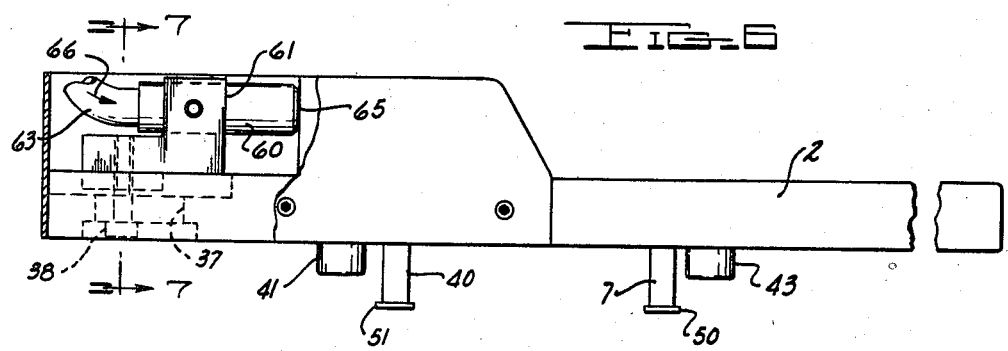
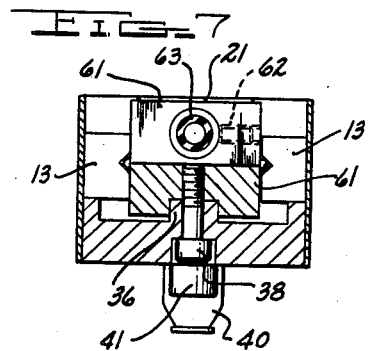
INVENTOR.
EDWARD TOMKOW
BY
SMITH, OLSEN & KOTTS
ATTORNEYS

United States Patent Office 2,876,550
Patented Mar. 10, 1959

2,876,550

GAGE FOR CHECKING INTERNAL AND EXTERNAL DIMENSIONS

Edward Tomkow, Dearborn, Mich., assignor to Ellstrom, Inc., Dearborn, Mich., a corporation of Michigan Application January 27, 1956, Serial No. 561,851

8 Claims. (Cl. 33—147)

This invention relates to gages for checking internal and external dimensions of workpieces and in particular the diameters of holes, widths of slots, outer dimensions of bar stock, or the like.

Such gages consist of a base on which are mounted two opposite contact elements. One of the contact elements is spring urged to permit the contact elements to engage opposite faces of the workpiece. One of the contact elements is preferably adjustable relative to the other so as to permit gaging workpieces of various dimensions. One of the contact elements is movably mounted so as to actuate an indicator mechanism, as for example, a dial indicator or an air leakage type indicator.

One problem encountered in connection with these gages is due to the fact that the movable contact element encounters frictional forces during its movement such as to reduce the gage sensitivity. In the present invention movable antifriction means is provided between the movable contact element and base of the gage whereby to minimize frictional forces encountered during contact element movement.

Another problem relates to the type of contact element biasing springs which are employed. Generally, coil springs are used, and these springs require relatively complex mounting mechanisms. In the present invention a simple leaf spring is employed which requires no complicated mounting mechanism.

Another problem in connection with these gages relates to the type of indicator mechanisms employed. In some instances it is desirable to employ a mechanical displacement type indictator such as is shown in United States Patent No. 2,392,617 issued on January 8, 1946, and in other instances it is desirable to employ an air leakage type indicator such as is shown in United States Patent No. 2,477,399 issued on July 26, 1949. Prior art gages make no provision for interchangeably employing these two different types of indicators with the same gage body. In the present invention the movable contact element is disposed at an intermediate point on the gage base so as to leave an end portion thereof free for the mounting of the indicator mechanism. The slide member which carries the movable contact is provided with a face extending at right angles to the direction of slide movement and in registry with the indicator mechanism. The placement and construction of the slide member permit either a mechanical displacement type indicator or an air leakage type indicator to be positioned on the gage base.

Another problem relates to the difficulty experienced in operatively placing the contact elements against the work. The work surface spacing is different from the contact element spacing (due to spring pressure on one of the contact elements), and consequently the contact element spacing must be manually varied before the contact elements can be operatively placed against the work surfaces. Prior art gages generally make no provision for easily varying this contact element spacing, and operation of prior art gages is for this reason cumbersome and tiresome for the operator. In one embodiment of the present invention the slide member which mounts the movable contact element is provided with an upwardly extending plate which functions as a finger engageable element for drawing the contact elements toward one another so as to permit easy insertion of the contact elements into operative engagement with the surfaces of the workpiece. The placement and construction of the slide member permit easy access to the finger engageable element and facilitate the drawing together process.

Another problem is that of measuring work surface spacings at different distances from the access end of the workpiece. In one embodiment of the present invention there is provided a plurality of rest members which project from the gage lesser distances than the contact elements. These rest members engage the accessible work areas and position the contact elements at desired locations on the surfaces to be gaged. By replacing the rest member with other similar members of different dimensions it is possible to vary the location of the contact elements on the gaged surfaces.

Prior art gages are limited in their applications by reason of the relatively small number of test surface spacings which they can gage. In one embodiment of the present invention the gage contact elements can be positioned adjacent one another so as to gage small spacings or far apart for gaging larger test surface spacings.

One object of the present invention is to provide a gage including two contact elements, wherein the contact elements can be drawn together or spaced apart so as to provide for the gaging of both small and large test surface spacings.

Another object is to provide a gage including a movable contact element, wherein frictional resistance to movement of said contact element is at a minimum.

Another object is to provide a gage including a spring-biased contact element, wherein the spring and its mounting are of relatively simple construction, thereby reducing the gage construction cost.

Another object is to provide a gage construction wherein there can be interchangeably employed either a mechanical displacement or an air leakage type indicator mechanism.

Another object is to provide a gage including two contact elements, wherein a manually actuable mechanism is employed for varying the distance between said contact elements so as to permit easy placement of the contact elements against the work surfaces.

Another object is to provide a gage wherein accurate measurements can be made at different distances from the exposed work surface.

Other objects of this invention will appear in the following description and appended claims, reference being had to the accompanying drawings forming a part of this specification wherein like reference characters designate corresponding parts in the several views.

In the drawings:

Fig. 1 is a top plan view of one embodiment of the invention, utilizing a dial indicator.

Fig. 2 is an elevational view of the embodiment with parts broken away for illustration purposes.

Fig. 3 is a bottom plan view of the embodiment shown in Fig. 1.

Fig. 4 is a sectional view taken on line 4—4 in Fig. 1.

Fig. 5 is a top plan view of the invention but with an air leakage type indicator substituted for the dial indicator shown in Fig. 1.

Fig. 6 is an elevational view taken in the same direction as Fig. 2, but with parts broken away to show details of the air leakage apparatus of Fig. 5.

Fig. 7 is a sectional view taken on line 7—7 of Fig. 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

There is shown in Figs. 1 through 4 a gage 1 including a body member or base 2. The latter is provided with a track-forming groove 3 along its lower face 4. A block 5 is seated in groove 3 for slidable movement therealong in the directions of arrows 6. A carbide tipped contact element 7 projects downwardly from block 5. Communicating with groove 3 is a longitudinal slot 8, and extending into block 5 through said slot is a screw 9. When screw 9 is tightened it pulls block 5 into clamping engagement against surfaces 10 and 11 of groove 3, thereby retaining contact element 7 in fixed position relative to base 2. When screw 9 is loosened, contact element 7 can be moved to any desired position along track 3.

There are positioned on the upper surface 12 of base 2 two blocks 13. Screws 14 immovably but releasably retain blocks 13 on base 2. Blocks 13 are provided with V-shaped grooves 15 which form raceways for antifriction balls 16. Positioned between blocks 13 is a slide member 17, the latter being provided with two V-shaped grooves 18 which form second raceways for antifriction balls 16. Stop means in the form of pins 19 and 70 are secured on base 2 so as to limit the motion of member 17 in the directions of arrows 23 and 53. A plate 21 is secured on slide member 17 by screws 22. A portion 52 of plate 21 projects above the upper surface 24 of slide member 17 so as to form a manually actuable mechanism for moving member 17 away from mechanical-displacement type dial indicator mechanism 25.

Mechanism 25 includes a sleeve 26 and an actuating plunger 27. A comparatively light spring mechanism within the dial indicator urges plunger 27 into engagement with surface 28 of member 17. A comparatively heavy leaf spring 29 contacts one of screws 22 so as to urge member 17 in the direction of arrow 23. Spring 29 is provided with a slotted mounting portion 30, and a screw 31 extends through the formed slot so as to immovably but releasably clamp spring 29 on base 2. The slot in portion 30 permits adjustment of the spring toward member 17 in the event that the spring pressure is insufficient to maintain member 17 against plunger 27.

Mechanism 25 includes a barrel 32 which is provided with a diametrically extending groove 33. Portions 34 and 35 of base 2 are hollowed out to form a bridge-like portion 36. Portion 36 is the same width as groove 33, and serves as a mechanism for non-rotatably mounting barrel 32. A through slot 37 is provided in portion 36, and a screw 38 extends through said slot into barrel 32. A countersink 39 is provided around slot 37 to recess screw 38 into base 2. Slot 37 permits adjustment of mechanism 25 in the directions of arrows 6.

Projecting from slide member 17 is a carbide tipped contact element 40. A cylindrical "rest" block 41 is immovably but releasably positioned on the lower face of base 2 by a screw 42. A similar "rest" block 43 is immovably but releasably positioned on the lower face of block 5 by a screw 44. The arrow 45 dimension of blocks 41 and 43 is less than that of contact elements 7 and 40 so as to permit said elements to project into opening 46 of work 47 an axial distance 48. The releasable mountings 42, 44 for blocks 41 and 43 permit interchange of blocks having different arrow 45 dimensions, and thus permit elements 7 and 40 to accurately gage the size of opening 46 at different axial distances from surface 49 of work 47. Blocks 41 and 43 not only serve as locating mechanisms for contact elements 7 and 40 but also as spacers for elevating base 2 above surface 49. Such spacing of base 2 permits the operator to more easily grasp the gage.

In operation the distance between surfaces 50 and 51 of fingers 7 and 40 may be standardized by positioning gage 1 over a workpiece having an opening 46 of the desired size, and applying a slight manual pressure against portion 52 of plate 21 in the direction of arrow 53. Block 5 may then be moved in the arrow 53 direction so as to position surfaces 50 and 51 against opposite faces of the opening. Tightening of screw 9 causes block 5 to be clamped against surfaces 10 and 11 with surfaces 50 and 51 spaced the desired distance apart. Dial 54 is then turned to bring its zero point into registry with pointer 55.

Insertion of fingers 7 and 40 into test openings may be easily effected by exerting a manual pressure on plate portion 52 so as to narrow the distance between surfaces 50 and 51. Comparison readings between the standard desired distance and the test opening dimension may be taken from dial 54.

It will be noted that indicator mechanism 25 is positioned on an end of base 2 remote from contact element 7. This indicator mechanism placement permits block 5 to be moved along track 3 until surfaces 56 and 57 of elements 7 and 40 are in facial contact with each other. When elements 7 and 40 are thus brought together they can gage relatively small work surface spacings.

The gage shown in Figs. 5 through 7 is the same as that shown in Figs. 1 through 4 except that mechanism 25 has been replaced by an indicator means in the form of an air leakage conduit 60. Conduit 60 is secured in a mounting block 61 by a set screw 62. Block 61 is grooved in the same manner as barrel 32, and screw 38 is extended through slot 37 to adjustably mount block 61 on bridge portion 36. Conduit 60 is fixedly secured on one end of a flexible tube 63. Tube 63 leads to an air flow measuring device such as that shown at 16 in United States Patent No. 2,477,399. Tube 63 corresponds to tube 15 in said patent.

The right end of conduit 60 is spaced slightly away from face 28 of slide member 17 so as to form an air leakage path 65. When air is passed through tube 63 and conduit 60 (from a source not shown) in the direction of arrow 66 the air flow will be determined by the size of path 65. The size of path 65 will in turn be determined ultimately by the spacing between surfaces 50 and 51, so that measurement of the air flow through tube 63 serves to measure the spacing between surfaces 50 and 51.

When it is desired to utilize the Fig. 1 gage or the Fig. 5 gage to measure external dimensions of workpieces it is necessary to rotate leaf spring 71 from its illustrated position to an operative position wherein its free end portion 72 presses against face 28 of member 17. A screw 73 is provided for clamping spring 71 in its operative position. Spring 29 must be rotated or otherwise moved to a position wherein its free end portion is away from the adjacent screw 22.

With springs 71 and 29 so repositioned a manual push may be applied to plate 21 to move member 17 in the arrow 23 direction against the action of spring 71. Movement of member 17 in the arrow 23 direction serves to draw gage surfaces 56 and 57 apart so as to permit easy placement of these gage surfaces on external surfaces of the workpiece (not shown).

I claim:

1. A gage comprising a base; a block slidably mounted on said base; means for releasably retaining said block in adjusted positions along said base; a contact element projecting from said block; a rest member fixedly but removably mounted on said block and projecting therefrom a lesser distance than said contact element; a slide member movably mounted on said base; a second contact element projecting from said slide member; element-spacing indicator means in registry with said slide member; and a second rest member fixedly but removably mounted on said base and projecting therefrom a lesser distance than said second contact element; the first and second contact elements extending beyond their respective rest members the same distance; the removable mountings of said rest members permitting the substitution of differently dimensioned rest members.

2. A gage comprising a base; a track extending along said base; a block slidably mounted on said track; a contact element projecting from said block; said base having a slot extending therethrough and into communication with said track; headed threaded means extending through said slot into said block for releasably clamping it in adjusted positions along said track; said base having an opening adjacent one end of said slot; a slide member extending through said opening; a second contact element projecting from said slide member; block members positioned on said base member and extending along side surfaces of said slide member; movable antifriction means between said block members and slide member; element-spacing indicator means positioned on said base and in registry with a face of the slide member remote from the slot; a leaf spring secured on said base and urging said slide member toward a work-engaged position and a finger-actuable member carried by said slide member and extending above the upper limit thereof.

3. A gage comprising a base, a block slidably mounted on said base, means for releasably retaining said block in adjusted positions along said base, a contact element projecting from said block, a rest member fixedly but removably mounted on said block and projecting therefrom a lesser distance than said contact element, a slide member mounted in roller bearings on said base for limited movement therealong, a second contact element projecting from said slide member, indicator means operably connected with said slide member, a second rest member fixedly but removably mounted on said base and projecting therefrom a lesser distance than said second contact element, the removable mountings of said rest members permitting the substitution of rest members having other dimensions.

4. A gage comprising a base, a block slidably mounted on said base, means for releasably retaining said block in adjusted positions along said base, a contact element projecting from said block, a rest member fixedly but removably mounted on said block and projecting therefrom a lesser distance than said contact element, a slide member movably mounted on said base, spring means mounted on said base urging said slide member toward a work-engaging position, a second contact element projecting from said slide member, dimension indicator means operably connected with said slide member, a second rest member fixedly but removably mounted on said base and projecting therefrom a lesser distance than said second contact element, the removable mountings of said rest members permitting the substitution of rest members having other dimensions.

5. The gage defined in claim 4 wherein each of the contact elements includes oppositely facing gage surfaces so that the gage can be for measuring internal or external dimensions on a workpiece.

6. The gage defined in claim 5 wherein spring means are mounted on said base for urging said slide member toward a work-engaging position when measuring either internal or external dimensions.

7. The gage defined in claim 3 wherein said slide member has a surface normal to its path of movement so that either a mechanical displacement or air leakage type indicator means may be used.

8. A gage comprising a base, a contact element projecting outwardly beyond one surface of said base, a rest member operatively connected to said base and projecting beyond said surface a lesser distance than said contact element, a slide member mounted on said base for limited movement therealong, a second contact element projecting from said slide member beyond said surface, indicator means operably connected with said slide member, a second rest member operably connected to said base and projecting therefrom beyond said surface a lesser distance than said second contact element, said rest members being removable to permit substitution of rest members having other dimensions.

References Cited in the file of this patent

UNITED STATES PATENTS

| | | |
|---|---|---|
| 536,676 | Wilcox | Apr. 2, 1895 |
| 869,578 | Le Compte | Oct. 29, 1907 |
| 1,634,156 | McCommon | June 28, 1927 |
| 1,972,124 | Aldeborgh et al. | Sept. 4, 1934 |
| 2,032,856 | Steiner | Mar. 3, 1936 |
| 2,138,411 | Tornebohn | Nov. 28, 1938 |
| 2,170,747 | Dimond | Aug. 22, 1939 |
| 2,216,795 | Aller | Oct. 8, 1940 |
| 2,372,879 | Bjorklund et al. | Apr. 3, 1945 |
| 2,392,617 | Sisson | Jan. 8, 1946 |
| 2,477,399 | Aller | July 26, 1949 |
| 2,636,278 | Krause | Apr. 28, 1953 |

FOREIGN PATENTS

| | | |
|---|---|---|
| 584,462 | Great Britain | Jan. 15, 1947 |
| 993,109 | France | July 18, 1951 |